United States Patent [19]
Keita et al.

[11] Patent Number: 5,796,011
[45] Date of Patent: Aug. 18, 1998

[54] CORIOLIS-TYPE MASS FLOW SENSOR

[75] Inventors: Mamadi Keita, Basel; Ennio Bitto, Aesch, both of Switzerland

[73] Assignee: Endress + Hauser Flowtech AG, Reinach, Switzerland

[21] Appl. No.: 747,637

[22] Filed: Nov. 13, 1996

Related U.S. Application Data

[63] Continuation-in-part of Ser. No. 277,497, Jul. 19, 1994, abandoned.

[30] Foreign Application Priority Data

Jul. 20, 1993 [EP] European Pat. Off. ............ 93810516

[51] Int. Cl.[6] .................................................. G01F 1/84
[52] U.S. Cl. ................................................. 73/861.357
[58] Field of Search ....................... 73/861.357, 861.355, 73/861.356, 861.354

[56] References Cited

U.S. PATENT DOCUMENTS

| | | | |
|---|---|---|---|
| 3,485,098 | 12/1969 | Sipin | 73/861.355 |
| 4,127,028 | 11/1978 | Cox et al. | 73/861.355 |
| 4,187,721 | 2/1980 | Smith | 73/861.356 |
| 4,252,028 | 2/1981 | Smith et al. | 73/861.355 |
| 4,491,025 | 1/1985 | Smith et al. | 73/861.355 |
| 4,793,191 | 12/1988 | Flecken et al. | 73/861.357 |
| 4,823,614 | 4/1989 | Dahlin | 73/861.367 |
| 4,831,885 | 5/1989 | Dahlin | 73/861.355 |
| 5,060,523 | 10/1991 | Lew | 73/861.355 |

FOREIGN PATENT DOCUMENTS

| | | |
|---|---|---|
| 0 109 218 | 5/1984 | European Pat. Off. . |
| 0 263 719 | 4/1988 | European Pat. Off. . |
| 0 473 919 | 3/1992 | European Pat. Off. . |
| WO 91/03713 | 3/1991 | WIPO . |

OTHER PUBLICATIONS

S.P. Timoshenko et al., "Theory of Structures", McGraw-Hill International Book Company, pp. 334–339, 1965.

Warren C. Young, "Roark's Formulas for Stress and Strain", McGraw-Hill Book Company, pp. 250–259, 1989.

U. Endress et al., "Flow handbook", FLOWTEC AG Kägenstrasse, pp. 98, 99, 182 and 183, 1989.

*Primary Examiner*—George M. Dombroske
*Assistant Examiner*—Harshad Patel
*Attorney, Agent, or Firm*—Bose McKinney & Evans

[57] ABSTRACT

This mass flow sensor, which can be mounted by means of end parts, in particular flanges, in a conduit of a given diameter through which flows a fluid to be measured, has two parallel, circular-arc-segment-shaped measuring tubes which are fixed at their ends in respective flanges. The measuring tubes have the same inner diameter D and the same wall thickness w. The circular-arc segment has a height h, an arc radius R, and a chord length L. The inner diameter D is chosen as a function of the maximum permissible pressure loss in the measuring tubes, and the wall thickness w as a function of the maximum permissible pressure of the fluid. The stress $\sigma_T$ resulting from a maximum permissible temperature change $\delta T$ of the fluid is chosen to be less than the $\sigma_{0.2}$-value of the material of the measuring tubes. Under these conditions and for a given arc radius R, the segment height h is chosen as small as possible to become $h_{min}$. An external support tube is provided whose ends are fixed to the respective end parts. Means are provided for exciting the measuring tubes into opposite sympathetic vibrations perpendicular to the respective circular-arc plane, and means for sensing, at at least two points spaced along the measuring tubes, the vibrations of the measuring tubes.

9 Claims, 4 Drawing Sheets

FIG. 10

CORIOLIS-TYPE MASS FLOW SENSOR

This application is a continuation-in-part of application Ser. No. 08/277,497 filed Jul. 19, 1994, now abandoned.

FIELD OF THE INVENTION

The present invention relates to a sensor of a mass flow meter working on the Coriolis principle, comprising two curved, parallel measuring tubes as vibrating bodies through which flows a fluid to be measured.

Background of the Invention

U.S. Pat. No. 4,491,025 discloses a mass flow meter working on the Coriolis principle which can be installed, by means of the flanges of a mounting, in a conduit of a given diameter through which flows a fluid to be measured, with two parallel, U-shaped measuring tubes of a circular cross-section each having at its two ends fixed in the mounting via an inlet manifold and and outlet manifold, respectively; means which excite the measuring tubes into opposite sympathetic vibrations perpendicular to the respective measuring-tube plane; and means which determine a time difference of the passage through the rest position of the legs of the measuring tubes, and the mass flow rate therefrom, at at least two points spaced along the measuring tubes.

U.S. Pat. No. 4,127,028 discloses a mass flow meter working on the Coriolis principle which can be installed by means of a mounting in a conduit of a given diameter through which flows a fluid to be measured, with a single measuring tube of a circular cross-section describing practically a full circle and laterally fixed in the mounting; with means which excite the measuring tube into sympathetic vibrations perpendicular to its plane; and with means which determine a time difference of the passage through the rest position of the legs of the measuring tubes, and the mass flow rate therefrom, at at least two points spaced along the measuring tube and located opposite each other.

In U.S. Pat. No. 4,187,721 it is stated that in addition to the mass flow rate, the density of the fluid can be measured with a mass flow meter working on the Coriolis principle and having a single U-shaped measuring tube, namely by evaluating the frequency of the vibrations of the measuring tube.

Besides this one class of mass flow sensors with (somehow) bent measuring tubes, there is another class, namely those with straight measuring tubes, as are described for example in applicant's U.S. Pat. No. 4,793,191.

This mass flow sensor which can be installed in a conduit of a given diameter so as to be axially aligned with said conduit, through which flows a fluid to be measured, has an inlet tube and an outlet tube, which serve to connect the mass flow sensor with the conduit; an inlet manifold and an outlet manifold; an external support tube whose ends are fixed to the inlet tube and outlet tube, respectively; two annular diaphragms via which the inlet and outlet tubes are connected to the inlet manifold and outlet manifold, respectively; two parallel, straight measuring tubes of a circular cross-section and of equal inner diameter and equal wall thickness each having its two ends fixed in the inlet manifold and outlet manifold, respectively; means which excite the measuring tubes into opposite sympathetic vibrations in a plane containing the axes of the measuring tubes; and means sensing the vibrations of the measuring tubes at at least two points spaced along the measuring tubes.

For various reasons, e.g., because of the sensitivity of this mass flow sensor to vibrations originating from the conduit or because of the dependence of the measurement result on the pressure of the fluid, the diaphragms in this prior art mass flow sensor cannot be made arbitrarily soft but must have a given minimum stiffness.

Since changes in the temperature of the fluid result in inhomogeneous temperature distributions in the mass flow sensor, they cause stress $\sigma_T$ in the vibrating, straight measuring tubes and in the diaphragms. If this stress reaches values above the yield point of the diaphragms, irreversible plastic deformation will take place, which irreversibly changes the characteristics of the vibrating system, so that recalibration of the mass flow meter will be necessary.

SUMMARY OF THE INVENTION

The invention defined in the claims serves to permit a selection and selective dimensioning, over a wide nominal-diameter range of mass flow sensors with tubes bent in one plane, with the properties of mass flow sensors with straight measuring tubes, such as low abrasion rate inside the measuring tubes caused by particles contained in the fluid, no splitting of multiphase fluids due to centrifugal forces, self-draining, and good cleanability as well as minimal effect of casing vibrations, being retained as far as possible.

Accordingly, the invention consists in a sensor of a mass flow meter through which a fluid flows working on the Coriolis principle, the sensor comprising first and second parallel measuring tubes each having a circular cross-section and each forming an arc segment of a circle having a chord length L; first and second flanges, the first and second parallel measuring tubes extending between the first and second flanges; means for exciting the parallel measuring tubes into opposite sympathetic vibrations perpendicular to the respective circular-arc segment; means for sensing the vibrations of the first and second parallel measuring tubes at at least two points spaced along the first and second parallel measuring tubes; each of the tubes having a wall thickness w chosen for maximum permissible pressure of the fluid flowing through the tubes; each of the tubes having a stress value $\sigma_T$ due to a maximum permissible temperature change $\delta T$ of the fluid which is chosen to be less than a $\sigma_{0.2}$-value of the material forming the tubes; each of the tubes having an internal diameter D determined as a function of the maximum permissible pres-sure loss $H_v$ in the tubes with the chord length L; and the circular-arc segment formed by each tube having a height $h_{min}$ which is a minimum height for the circular-arc segment determined as a function of the chosen wall thickness w, the chosen stress value $\sigma_T$, and the determined internal diameter D.

Further the invention consists in a sensor of a mass flow meter through which a fluid flows working on the Coriolis principle, the sensor comprising first and second parallel measuring tubes each having a circular cross-section and each forming an arc segment of a circle having a chord length L; each of the tubes having a wall thickness w chosen for maximum permissible pressure of the fluid flowing through the tubes; each of the tubes having a stress value $\sigma_T$; each of the tubes having an internal diameter D determined as a function of the maximum permissible pres-sure loss $H_v$ in the tubes with the chord length L; and the circular-arc segment formed by each tube having a height $h_{min}$ which is a minimum height for the circular-arc segment determined as a function of the chosen wall thickness w, the chosen stress value $\sigma_T$, and the determined internal diameter D.

In a preferred embodiment of the invention the first and second measuring tubes are fixed to the respective first and second flanges without a manifold.

3

In another preferred embodiment of the invention the first and second measuring tubes include first and second ends and further comprising first and second transition tubes situated between the first and second flanges and the first and second ends, respectively, of the first measuring tube and third and fourth transition tubes situated between the first and second flanges and the first and second ends, respectively, of the second measuring tube, wherein the first, second, third and fourth transition tubes include an internal diameter D1 and a wall thickness w1 that is equal to the internal diameter D and the wall thickness w of the first and second measuring tubes and are inserted so that each transitions tubes have its circular cross-section fixed in the respective first and second flanges.

In yet another preferred embodiment of the invention the sensor comprises further first and second node plates configured to firmly connect the first and second measuring tubes near each of the first and second flanges, respectively, and a first supporting plate fixed to the first and second node plates, the exiting means and sensing means include a driver arrangement and two sensors mounted on the first supporting plate and the first and second measuring tubes, respectively.

In still another preferred embodiment of the invention the first and second measuring tubes are made of 904L steel.

In yet another preferred embodiment of the invention the first and second measuring tubes and the first, second, third and fourth transition tubes are made of 904L steel.

An essential advantage of the invention is that the circular-arc-shaped measuring tubes can be manufactured with high mechanical accuracy, so that excellent symmetry of the mass flow sensor is attainable.

BRIEF DESCRIPTION OF THE DRAWINGS

The invention will now be explained in more detail with reference to the accompanying drawing, which shows schematically three embodiments of the invention.

FIG. 1 is a vertical longitudinal section of a first embodiment of a mass flow sensor in accordance with the invention;

FIG. 2b is an enlargement of the cross-section of the measuring tubes in FIG. 2a;

FIG. 3 is a section taken along line II—II of FIG. 1;

DETAILED DESCRIPTION OF THE DRAWINGS

Figures 1, 2B, 3:
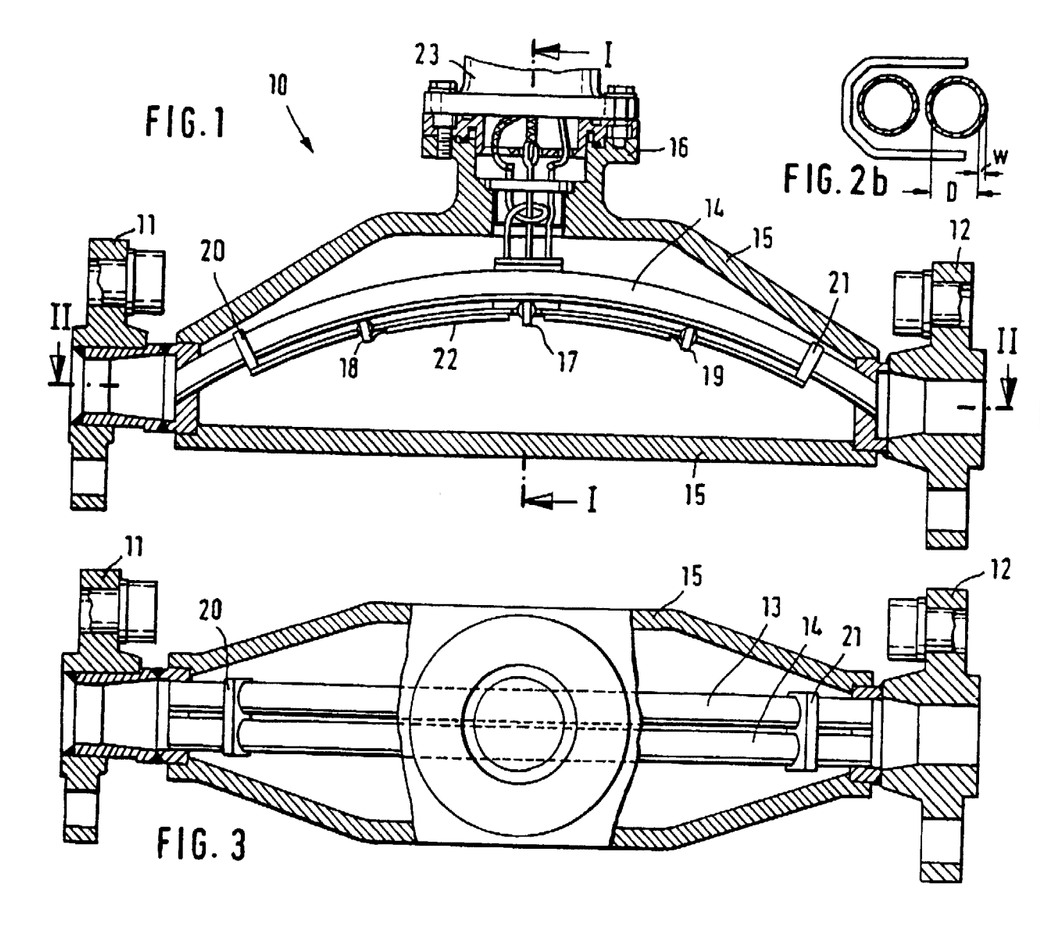
Figure 2A:
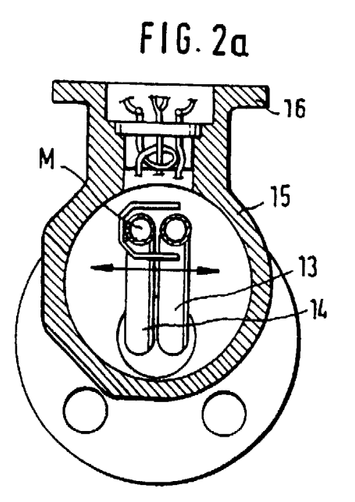
FIG. 2a is a section taken along the line I—I of FIG. 1.

A first embodiment of a mass flow sensor 10, is shown in FIG. 1 in a vertical longitudinal section, in FIG. 2a in a section taken along line I—I of FIG. 1 and in FIG. 3 in a section taken along line II—II of FIG. 1. The mass flow sensor 10 can be installed by means of flanges 11, 12 in a conduit of a given nominal diameter (not shown to simplify

4 the illustration) through which flows a fluid to be measured, includes two parallel measuring tubes 13, 14 having the form of a segment of a circular arc, which are fixed at their ends in the respective flanges 11, 12. The mass flow sensor 10 is understood as being the mechanical part of a Coriolis-type mass flow meter.

Figure 4:
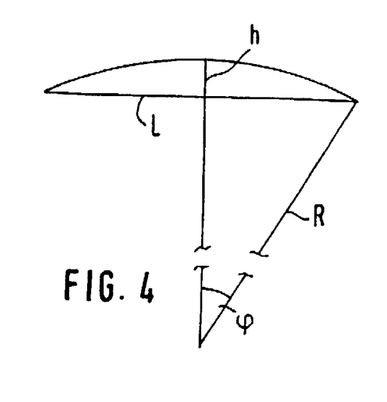
FIG. 4 is a geometrical representation of a circular-arc segment with its defining quantities.

The measuring tubes 13, 14 have practically the same internal diameter D and the same wall thickness w, see FIG. 2b. The circular-arc segment has in general a height h, which is, according to the invention, a minimum high $h_{min}$, and further an arc radius R, and a chord length L, see FIG. 4. Because of simple geometrical relationships, two of these defining quantities suffice to unambiguously determine the dimensions of the arc. These defining quantities are referred to the center of the cross section of one of the measuring tubes.

The flange 11 has been drawn as a flange according to the ANSI standard, and the flange 12 as a flange according to a European standard, such as DIN.

The flanges 11, 12 are mounted in an external support member 15. In FIG. 1, the support member 15 merges at the top with another flange 16, to which a housing 23 for evaluation and driver electronics (shown only partly) can be attached, or is attached in the finished condition of the mass flow meter.

In operation, the measuring tubes 13, 14 are excited by suitable means into opposite sympathetic vibrations perpendicular to the respective circular-arc plane, i.e., in the direction indicated by the arrow in FIG. 2a.

These means comprise an electrodynamic driver arrangement 17, e.g., with coil and armature, the one part of which is mounted on the measuring tubes 13, 14 and the other part of which is mounted on a support plate 22 midway between the flanges. The associated driver electronics, as mentioned, are contained in the housing 23. The driver electronics may be, for example, of the type described in U.S. Pat. No. 4,801,897.

In operation, the vibrations of the measuring tubes 13, 14 are sensed by means which are spaced along the measuring tubes at at least two points. These means comprise two sensors 18, 19 connected to the evaluation electronics.

In FIG. 1, the sensors 18, 19 are arranged symmetrically about the vertical central axis being identical to the line I—I, i.e., the sensors 18, 19 are equidistant from the mounting point in the flanges 11, 12. These sensors may be, for example, optoelectronic sensors as are described in the above-mentioned U.S. Pat. No. 4,801,897, or electromagnetic sensors as are explained, for example, in European Patent 83 144.

The evaluation electronics determine the mass flow rate from a phase difference of the signals of the sensors 18, 19 and/or the density of the fluid from the vibration frequency of the measuring tubes 13, 14. Evaluation electronics for the above mentioned optoelectronic sensors are described, for example, in the journal "Automatisie-rungstechnische Praxis atp", 1988, No. 5, pages 224 to 230.

In the embodiment shown in FIGS. 1 to 3, the measuring tubes 13, 14 are firmly connected with one another by two node plates 20, 21 each provided near one of the flanges 11, 12. Fixed to the node plates is a supporting plate 22 on which parts of driver arrangement 17 and parts of the two sensors 18, 19 are mounted. The node plates 20, 21 also serve to isolate the vibrations of the measuring tubes 13, 14 from the flanges 11, 12.

Figure 5:
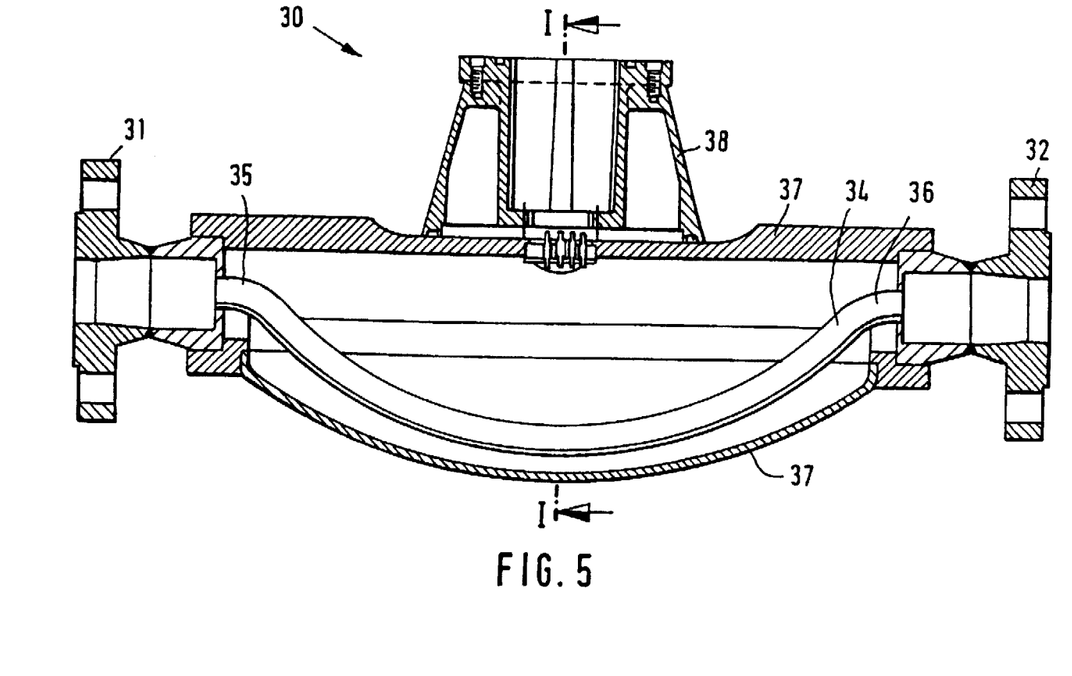
FIG. 5 is a vertical longitudinal section of a second embodiment of a mass flow sensor in accordance with the invention.

A second embodiment of a mass flow sensor 30, shown in FIG. 5 in a vertical longitudinal section, can also be installed by means of flanges 31, 32 in a conduit of a given nominal diameter (not shown to simplify the illustration) through which flows a fluid to be measured and is the mechanical part of a Coriolis-type mass flow meter. This second embodiment differs only in a few details to be explained below from the first embodiment of FIGS. 1 to 3.

The mass flow sensor 30 includes again two parallel measuring tubes 33, 34 having again the form of a segment of a circular arc, but which are fixed at their ends in the respective flanges 31, 32 via transition tubes of which only the transition tubes 35, 36 belonging to the measuring tube 34 are visible in FIG. 5. The four transition tubes have their circular cross-section fixed in the respective flange. Therefore, unlike as with the first embodiment the fixing of an elliptic cross-section in the flanges can be avoided.

The measuring tubes 33, 34 including the transition tubes have practically the same internal diameter D and the same wall thickness w. Their circular-arc segment, now arranged between the transition tubes has again a height h, which is, according to the invention, a minimum high $h_{min}$, and further an arc radius R, and a chord length L, as already explained with respect to FIG. 4.

The flanges 31, 32 are mounted in an external support member 37. In FIG. 5, the support member 37 is connected at the top to another flange 38, to which a housing for evaluation and driver electronics (shown only partly) can be attached, or is attached in the finished condition of the mass flow meter.

Whereas in the embodiment of FIGS. 1 to 3 the measuring tubes are bent towards the housing 23 of evaluation electronics, in the embodiment of FIG. 5 they are bent in opposite direction. But both bending directions are equivalent; therefore, the bending type of FIG. 1 could also be applied with the mass flow sensor of FIG. 5 and vice versa.

Figure 6:
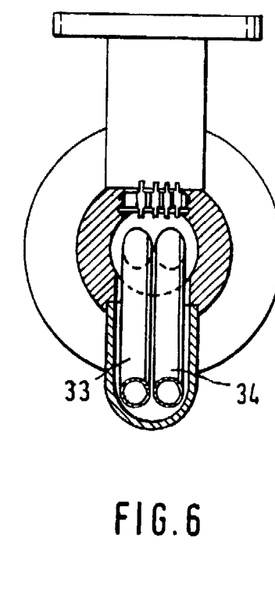
FIG. 6 is a section taken along line I—I of FIG. 5.

For clarity purposes parts similar to parts 17, 18, 19, 20, 21 of FIGS. 1 to 3 are not shown in FIG. 5. The driver and evaluating electronics for the second embodiment of FIGS. 5 and 6 can be the same as explained above.

Figure 7:
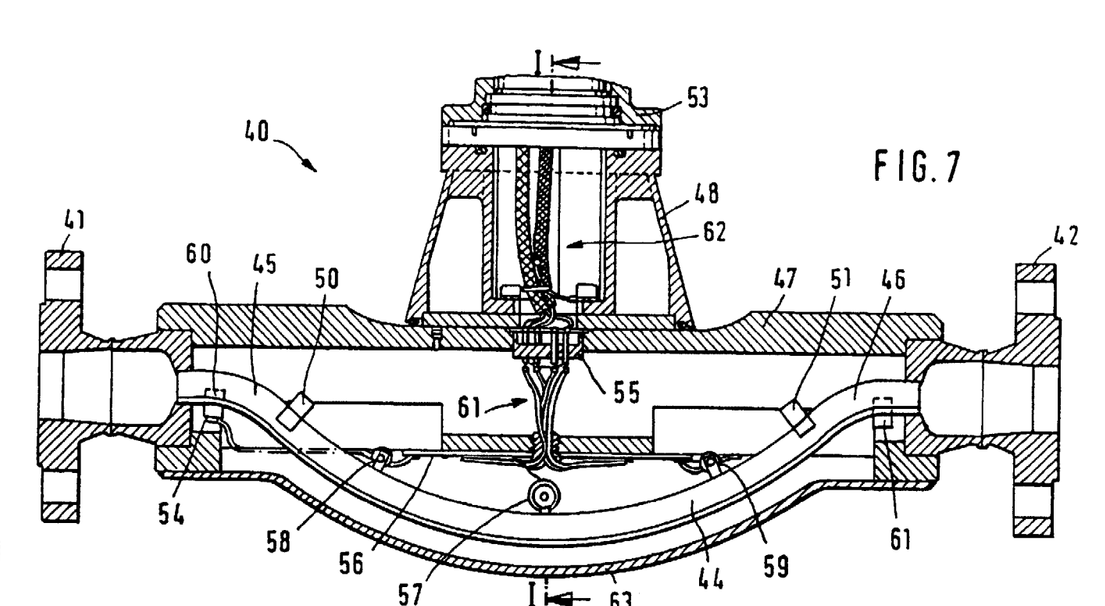
FIG. 7 is a vertical longitudinal section of a third embodiment of a mass flow sensor in accordance with the invention.

A third embodiment of a mass flow sensor 40, shown in FIG. 7 in a vertical longitudinal section, can also be installed by means of flanges 41, 42 in a conduit of a given nominal diameter (not shown to simplify the illustration) through which flows a fluid to be measured and is the mechanical part of a Coriolis-type mass flow meter. This third embodiment differs only in a few details to be explained below from the first and/or the second embodiment of FIGS. 1 to 6.

The mass flow sensor 40 includes again two parallel measuring tubes 43, 44 having again the form of a segment of a circular arc, but which are fixed at their ends in the respective flanges 41, 42 via transition tubes of which only the transition tubes 45, 46 belonging to the measuring tube 44 are visible in FIG. 7. The four transition tubes have their circular cross-section fixed in the respective flange. Therefore, unlike as with the first and second embodiment the fixing of an elliptic cross-section in the flanges can be avoided.

The measuring tubes 43, 44 including the transition tubes have practically the same internal diameter D and the same wall thickness w. Their circular-arc segment, now arranged between the transition tubes has again a height h, which is, according to the invention, a minimum high $h_{min}$, and further an arc radius R, and a chord length L, as already explained with respect to FIG. 4.

The flanges 41, 42 are mounted in an external support member 47. In FIG. 7, the support member 47 is connected at the top to another flange 48, to which a housing 53 for evaluation and driver electronics (shown only partly) can be attached, or is attached in the finished condition of the mass flow meter. A housing cap 63 closes firmly the support member 47 at the side opposite to the flange 48.

Whereas in the embodiment of FIGS. 1 to 3 the measuring tubes are bent towards the housing 23 of evaluation electronics, in the embodiment of FIG. 7 they are bent in opposite direction. But both bending directions are equivalent; therefore, the b ending type of FIG. 1 could also be applied with the mass flow sensor of FIG. 7 and vice versa.

Figure 8:
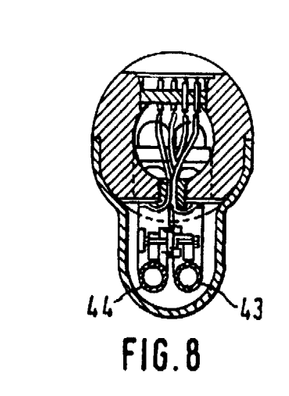
FIG. 8 is a section taken along line I—I of FIG. 7.
Figure 9:
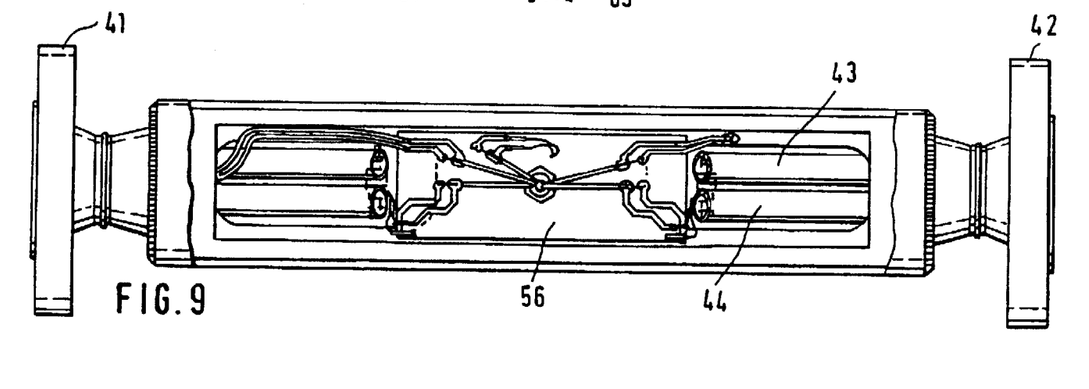
FIG. 9 is a cut-away view of the mass flow sensor of FIG. 7.

In the embodiment shown in FIGS. 7 to 9, the measuring tubes 43, 44 are firmly connected with one another by two node plates 50, 51 each located where the transition tubes are connected to the respective measuring tube. The node plates 50, 51 extend around on about one half the periphery of the measuring tubes. The above mentioned chord length L is now present between the two node plates 50, 51. Two additional node plates 60, 61 are fixed to the transition tubes 45, 46 near the flanges and extend around on about the other half the periphery of the transition tubes.

In operation, the measuring tubes 43, 44 are excited by suitable means into opposite sympathetic vibrations perpendicular to the respective circular-arc plane. These means comprise an electrodynamic driver arrangement 57, e.g., with coil and armature, the one part of which is mounted on the measuring tubes 43 and the other part of which is mounted on the measuring tubes 44 midway between the flanges. The associated driver electronics are contained in the housing 53. The driver electronics may be, for example again, of the type described in U.S. Pat. No. 4,801,897.

In operation, the vibrations of the measuring tubes 43, 44 are sensed by means which are spaced along the measuring tubes at at least two points. These means comprise two sensors 58, 59 connected to the evaluation electronics.

In FIG. 7, the sensors 58, 59 are arranged symmetrically about the vertical central axis being identical to the line I—I, i.e., the sensors 58, 59 are equidistant from the mounting point in the flanges 11, 12. These sensors may be, for example, optoelectronic sensors as are described in the above-mentioned U.S. Pat. No. 4,801,897, or electromagnetic sensors as are explained, for example again, in European Patent 83 144.

A temperature sensor 54 is fixed on the node plate 60 thereby sensing the actual temperature of it and, therefore, of the fluid the mass flow rate is to be measured.

The rather thin leads of the driver means 57, the sensor means 58, 59 and the temperature sensor 54 are fixed to a printed circuit board 56 which itself is fixed to an inner part of the support member 47. Thicker leads 61 connect the circuit board 57 to a feed-through part 55 fixed in an opening of the outer part of the support member 47. Further leads 62, preferably screened connect the feed-through part 55 to evaluation electronics.

Each measuring tube and their two transition tubes are made as one piece. The measuring tubes and the transition tubes, if present, are preferably made of 904L steel. Therefore, the stress corrosion cracking resistance of the mass flow sensor is very much improved with respect to tubes made of other steels or materials.

The defining quantities of the measuring tubes 13, 14, or 33, 34 or 43, 44, namely the wall thickness w, the inner diameter D, the minimum segment height $h_{min}$ to be chosen according to the invention, and the arc radius R, are determined as follows:

First, a desirable length L of the circular-arc of the measuring tubes is chosen.

Then the inner diameter D is chosen as a function of the maximum permissible pressure loss $H_v$ of the fluid in the measuring tubes using, e.g., the formula $$H_v = (\text{lambda})(L'v^2)/(2Dg)$$

wherein
L' is the straight length of the measuring tube,
v is the average velocity of the fluid, and
g is the gravity constant.

This formula is taken from the book of U. Endress et al "Flow Handbook", Reinach (Switzerland), 1989, page 98, and lambda is taken from table 23 on page 182 of that book.

Then, the stress $\sigma_T$ caused by a maximum permissible or predetermined temperature change $\delta T$ of the fluid is chosen to be less than the $\sigma_{0.2}$-value of the material of the measuring tubes (the $\sigma_{0.2}$-value is that value of the elasticity curve of a given material at which no plastic deformation takes place yet, i.e., the so-called yield strenght value).

In this way the minimum segment height $h_{min}$ according to the invention is determined and, therefore, also the arc radius R.

The calculations for this determination are based on the following equations for the thermal stress $\sigma_T$ and on using $\sigma_T \leq \sigma_{0.2}$:

For $(wR)/D^2 < 1.472$:

$$\sigma_T = F/A + (2hFD)/\{3I\Gamma(3\beta)^{1/2}\} \qquad (1)$$

or
for $(wR)/D^2 > 1.472$:

$$\sigma_T = F/A + (2hFD)/\{I\Gamma(1-\beta)\} \qquad (2)$$

where $$\beta = 6/\{5+6(wR/D^2)^2\} \qquad (3)$$

and $$\Gamma = 1 - 9/\{10+12(wR/D^2)^2\} \qquad (4)$$

In the two equations (1) and (2), respectively, the first addend F/A is the simple stress caused by the thermal expansion, and the second addend is the additional stress caused by the bending of the measuring tube due to thermal expansion.

These latter addends and the two equations (3) and (4), respectively, correspond to equivalent ones disclosed in the book of W. C. Young "Roark's Formulas for Stress and Strain", Sixth Edition, New York, 1989, page 252, having the following form:

For $(tR)/a^2 \leq 1.472$:

$$\sigma_{max} = 2Ma/\{3I\Gamma(3\beta)^{1/2}\} \qquad (1')$$

or
for $(tR)/a^2 > 1.472$:

$$\sigma_{max} = Ma/\{I\Gamma(1-\beta)\} \qquad (2')$$

$$\beta = 6/\{5+6(tR/a^2)^2\} \qquad (3')$$

and $$\Gamma = 1 - 9/\{10+12(tR/a^2)^2\} \qquad (4')$$

Obviously between the quantities of equations (1'), (2'), (3') and (4') and the quantities of equations (1), (2), (3) and (4) the following identities hold:
t≡w; a≡D; M≡hF; K≡Γ.

Further, in equations (1) and (2)

$$F = \{2ER\alpha\phi(\delta T)\}/(J_1/I + J_2/A) \qquad (5)$$

$$J_1 = 2\phi R(R-h)^2 - 4R^2(R-h)\sin\phi + R^3(\phi + 0.5\sin2\phi) \qquad (6)$$

$$J_2 = R(\phi + 0.5\sin2\phi) \qquad (7)$$

$$I = wD^3\pi/32 \qquad (8)$$

(i.e., the planar moment of inertia of the cross section of a measuring tube), $$A = w\pi D/2 \qquad (9)$$

(i.e., the cross-sectional area of the wall of a measuring tube),

α=the coefficient of thermal expansion of the material the measuring tubes consist of,
E=the modulus of elasticity (Young's modulus),
$\phi = \cos^{-1}(1-h/R)$ (i.e., the semi-angle of the circular arc).

The two equations (6) and (7), respectively, correspond to the first and the second denominator integral of equation 8.3 disclosed in the book of S. P. Timoshenko, D. H. Young "Theory of Structures", second Edition, Auckland, 1965, page 337 and solved for a circular arc.

Figure 10:
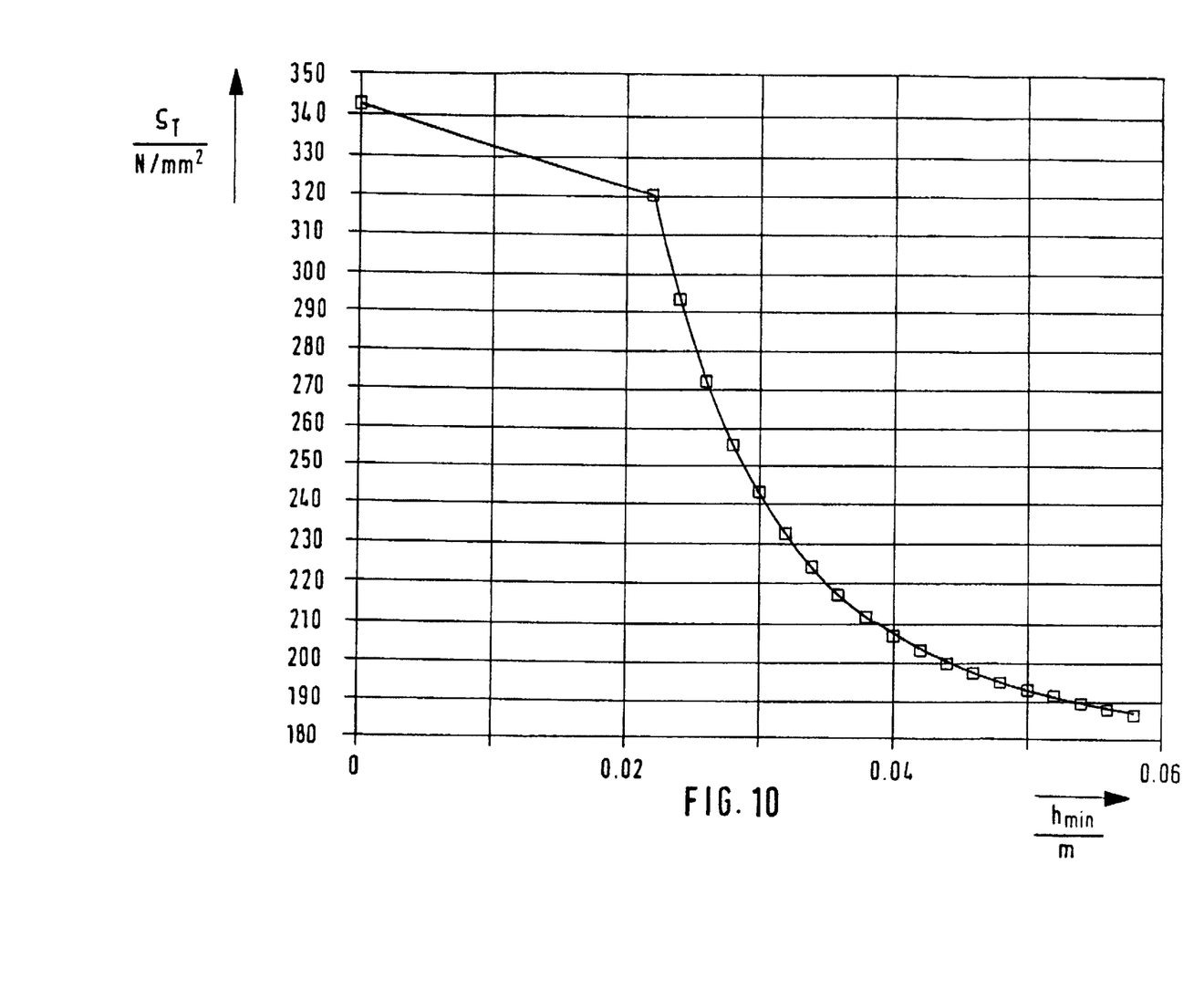
FIG. 10 is a graph for a concrete design.

FIG. 10 shows a curve for a concrete calculation in which the following quantities were given under the above aspects:
$E = 2.16 \cdot 10^{11}$ N/m²,
$\alpha = 1.22 \cdot 10^{-7}$ K$^{-1}$—these are the values for steel,
L=310 mm,
D=12.7 mm,
w=0.41 mm,
$\delta T$=130 K—e.g., between 20° C. and 150° C.

In the graph of FIG. 10 the figures on the abscissa represents the segment height h in meters (=m), and the figures on the ordinate represents the thermally induced stress $\sigma_T$ in Newton per square millimeters (=N/mm²). The curve contains the values of the minimum permissible segment heigth $h_{min}$ according to the invention. Therefore, the curve allows to choose $h_{min}$ as a function of the permissible thermally induced stress $\sigma_T$.

The curve shows for example that for a permissible thermally induced stress $\sigma_T$ of approximately 190 N/mm² the minimum segment height $h_{min}$ is approximately 50 mm.

We claim:

1. A sensor of a mass flow meter through which a fluid flows working on the Coriolis principle, the sensor comprising
   first and second parallel measuring tubes each having a circular cross-section and each forming an arc segment of a circle having a chord length L,
   first and second flanges, the first and second parallel measuring tubes extending between the first and second flanges,
   means for exciting the first and second parallel measuring tubes into opposite sympathetic vibrations perpendicular to the respective circular-arc segment,
   means for sensing the vibrations of the first and second parallel measuring tubes at least two points spaced along the first and second parallel measuring tubes,
   each of the tubes having a wall thickness w chosen for maximum permissible pressure of the fluid flowing through the tubes, each of the tubes having a stress value $\sigma_T$ due to a maximum permissible temperature change $\delta T$ of the fluid which is chosen to be less than a $\sigma_{0.2}$-value of the material forming the tubes, each of the tubes having an internal diameter D determined as a function of the maximum permissible pressure loss $H_v$ in the tubes with the chord length L, and the circular-arc segment formed by each tube having a height $h_{min}$ which is a minimum height for the circular-arc segment determined as a function of the chosen wall thickness w, the chosen stress value $\sigma_T$, and the determined internal diameter D.

2. The sensor of claim 1 wherein the first and second measuring tubes are fixed to the respective first and second flanges without a manifold.

3. The sensor of claim 2 further comprising first and second node plates configured to firmly connect the first and second measuring tubes near each of the first and second flanges, respectively, and a first supporting plate fixed to the first and second node plates, the exiting means and sensing means include a driver arrangement and two sensors mounted on the first supporting plate and the first and second measuring tubes, respectively.

4. The sensor of claim 2 wherein the first and second parallel measuring tubes are made of 904L steel.

5. The sensor of claim 1 wherein the first and second measuring tubes include first and second ends and further comprising first and second transition tubes situated between the first and second flanges and the first and second ends, respectively, of the first measuring tube and third and fourth transition tubes situated between the first and second flanges and the first and second ends, respectively, of the second measuring tube, wherein the first, second, third and fourth transition tubes include an internal diameter D1 and a wall thickness w1 that is equal to the internal diameter D and the wall thickness w of the first and second measuring tubes and are inserted so that each of the first, second, third and fourth transition tubes have its circular cross-section fixed in the respective first and second flanges.

6. The sensor of claim 5 further comprising first and second node plates configured to firmly connect the first and second measuring tubes near each of the first and second flanges, respectively, and a first supporting plate fixed to the first and second node plates, the exiting means and sensing means include a driver arrangement and two sensors mounted on the first supporting plate and the first and second measuring tubes, respectively.

7. The sensor of claim 5 wherein the first and second parallel measuring tubes and the first, second, third and fourth transition tubes are made of 904L steel.

8. The sensor of claim 1 further comprising first and second node plates configured to firmly connect the first and second measuring tubes near each of the first and second flanges, respectively, and a first supporting plate fixed to the first and second node plates, the exiting means and sensing means include a driver arrangement and two sensors mounted on the first supporting plate and the first and second measuring tubes, respectively.

9. The sensor of claim 1 wherein the first and second parallel measuring tubes are made of 904L steel.

* * * * *

UNITED STATES PATENT AND TRADEMARK OFFICE
CERTIFICATE OF CORRECTION

PATENT NO. : 5,796,011
DATED : August 18, 1998
INVENTOR(S) : Leita, et. al.

It is certified that error appears in the above-identified patent and that said Letters Patent is hereby corrected as shown below:

Title page, item [73] Assignee: should be-- Endress + Hauser Flowtec AG--.

Signed and Sealed this

Seventeenth Day of November, 1998

Attest:

BRUCE LEHMAN

*Attesting Officer*                  *Commissioner of Patents and Trademarks*